(12) United States Patent
Natanzon et al.

(10) Patent No.: US 9,069,709 B1
(45) Date of Patent: Jun. 30, 2015

(54) DYNAMIC GRANULARITY IN DATA REPLICATION

(71) Applicants: Assaf Natanzon, Tel Aviv (IL); Jehuda Shemer, Kfar Saba (IL)

(72) Inventors: Assaf Natanzon, Tel Aviv (IL); Jehuda Shemer, Kfar Saba (IL)

(73) Assignee: EMC International Company, Hamilton (BM)

( * ) Notice: Subject to any disclaimer, the term of this patent is extended or adjusted under 35 U.S.C. 154(b) by 171 days.

(21) Appl. No.: 13/925,134

(22) Filed: Jun. 24, 2013

(51) Int. Cl.
*G06F 17/00* (2006.01)
*G06F 11/14* (2006.01)

(52) U.S. Cl.
CPC .................................. *G06F 11/1446* (2013.01)

(58) Field of Classification Search
None
See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B2 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,149,858 B1 * | 12/2006 | Kiselev ........................ 711/162 |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Apr. 29, 1991; 1 Page.

(Continued)

*Primary Examiner* — Hung Le
(74) *Attorney, Agent, or Firm* — Daly, Crowley, Mofford & Durkee, LLP

(57) ABSTRACT

In one aspect, a method includes sending a snapshot of a primary volume to a replica site, determining if a bandwidth is available to send changes in the primary volume to the replica site to allow any point in time recovery of data in the primary volume and sending the changes from the primary volume if the bandwidth is available.

13 Claims, 10 Drawing Sheets

(56) References Cited

U.S. PATENT DOCUMENTS

| | | |
|---|---|---|
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,590,887 B2 | 9/2009 | Kano |
| 7,606,940 B2 | 10/2009 | Yamagami |
| 7,627,612 B2 | 12/2009 | Ahal et al. |
| 7,627,687 B2 | 12/2009 | Ahal et al. |
| 7,644,244 B2 * | 1/2010 | Homma et al. ............... 711/162 |
| 7,694,086 B1 * | 4/2010 | Bezbaruah et al. ........... 711/162 |
| 7,719,443 B1 | 5/2010 | Natanzon |
| 7,757,057 B2 | 7/2010 | Sangapu et al. |
| 7,774,565 B2 | 8/2010 | Lewin et al. |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0131278 A1 * | 7/2003 | Fujibayashi ................. 714/6 |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2004/0260900 A1 * | 12/2004 | Burton et al. ................. 711/162 |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0144407 A1 * | 6/2005 | Colgrove et al. ............. 711/162 |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2006/0212462 A1 | 9/2006 | Heller et al. |
| 2007/0055833 A1 | 3/2007 | Vu et al. |
| 2007/0094467 A1 * | 4/2007 | Yamasaki ................. 711/162 |
| 2007/0150677 A1 * | 6/2007 | Homma et al. ............... 711/162 |
| 2007/0162513 A1 | 7/2007 | Lewin et al. |
| 2007/0180304 A1 | 8/2007 | Kano |
| 2007/0186001 A1 * | 8/2007 | Wayda et al. ................. 709/230 |
| 2007/0198602 A1 | 8/2007 | Ngo et al. |
| 2007/0198605 A1 * | 8/2007 | Saika ............................. 707/202 |
| 2007/0198791 A1 | 8/2007 | Iwamura et al. |
| 2007/0220311 A1 | 9/2007 | Lewin et al. |
| 2007/0220320 A1 * | 9/2007 | Sen et al. ..................... 714/13 |
| 2007/0245104 A1 * | 10/2007 | Lindemann et al. .......... 711/162 |
| 2007/0245105 A1 * | 10/2007 | Suzuki et al. ................. 711/162 |
| 2007/0266053 A1 | 11/2007 | Ahal et al. |
| 2008/0082591 A1 | 4/2008 | Ahal et al. |
| 2008/0082592 A1 | 4/2008 | Ahal et al. |
| 2008/0082770 A1 | 4/2008 | Ahal et al. |
| 2010/0005259 A1 * | 1/2010 | Prahlad et al. ................ 711/162 |
| 2010/0049230 A1 * | 2/2010 | Pershin et al. ................ 711/162 |
| 2010/0145909 A1 * | 6/2010 | Ngo ............................. 707/611 |
| 2010/0185587 A1 * | 7/2010 | Lovinger ..................... 707/660 |
| 2012/0303791 A1 * | 11/2012 | Calder et al. ................. 709/224 |
| 2013/0054528 A1 * | 2/2013 | Saika ............................ 707/638 |
| 2013/0138909 A1 * | 5/2013 | Yoshida et al. ............... 711/165 |

OTHER PUBLICATIONS

Soules, "Metadata Efficiency in Versioning File Systems;" 2003; 16 Pages.

AIX System Management Concepts: Operating Systems and Devices; May 2000; 280 Pages.

(56) References Cited

OTHER PUBLICATIONS

Soules et al.; "Metadata Efficiency in a Comprehensive Versioning File System;" May 2002; CMU-CS-02-145; School of Computer Science, Carnegie Mellon University, Pittsburgh, PA 15213; 33 Pages.
Linux Filesystems; Sams Publishing; 2002; 12 Pages.
Bunyan, "Multiplexing in a BrightStor® ARCserve® Backup Release 11;" Mar. 2004; 4 Pages.
Marks, "Network Computing;" Feb. 2, 2006; 8 Pages.
Hill, "Network Computing;" Jun. 8, 2006; 9 Pages.
Microsoft Computer Dictionary; 2002; Press Fifth Edition; 3 Pages.
Retrieved from http://en.wikipedia.org/wiki/DEFLATE; Deflate; Jun. 19, 2008; 6 Pages.
Retrieved from http://en.wikipedia.org/wiki/Huffman_coding; Huffman Coding; Jun. 8, 2008; 11 Pages.
Retrieved from http:///en.wikipedia.org/wiki/LZ77; LZ77 and LZ78; Jun. 17, 2008; 2 Pages.
U.S. Appl. No. 11/609,560 downloaded Feb. 23, 2015; 265 Pages.
U.S. Appl. No. 12/057,652 downloaded Feb. 23, 2015; 296 Pages.
U.S. Appl. No. 11/609,561 downloaded Feb. 23, 2015; 219 Pages.
U.S. Appl. No. 11/356,920 downloaded Feb. 23, 2015; 272 Pages.
U.S. Appl. No. 10/512,687 downloaded Feb. 23, 2015; 300 Pages.
U.S. Appl. No. 10/512,687 downloaded Feb. 23, 2015; 254 Pages.
U.S. Appl. No. 11/536,233 downloaded Feb. 23, 2015; 256 Pages.
U.S. Appl. No. 11/536,215 downloaded Feb. 23, 2015; 172 Pages.
U.S. Appl. No. 11/536,160 downloaded Feb. 23, 2015; 230 Pages.
U.S. Appl. No. 11/964,168 downloaded Feb. 23, 2015; 222 Pages.

* cited by examiner

DYNAMIC GRANULARITY IN DATA REPLICATION

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes sending a snapshot of a primary volume to a replica site, determining if a bandwidth is available to send changes in the primary volume to the replica site to allow any point in time recovery of data in the primary volume and sending the changes from the primary volume if the bandwidth is available.

In another aspect, an apparatus includes electronic hardware circuitry configured to send a snapshot of a primary volume to a replica site, determine if a bandwidth is available to send changes in the primary volume to the replica site to allow any point in time recovery of data in the primary volume and send the changes from the primary volume if the bandwidth is available.

In a further aspect, an article includes a non-transitory computer-readable medium that stores computer-executable instructions. The instructions cause a machine to send a snapshot of a primary volume to a replica site, determine if a bandwidth is available to send changes in the primary volume to the replica site to allow any point in time recovery of data in the primary volume and send the changes from the primary volume if the bandwidth is available.

BRIEF DESCRIPTION OF THE DRAWINGS

FIG. 6A are block diagrams of examples of snapshots.

FIG. 6B is a block diagram of a difference journal.

FIG. 6C is a block diagram of an intermediary snapshot.

DETAILED DESCRIPTION

Figure 1:
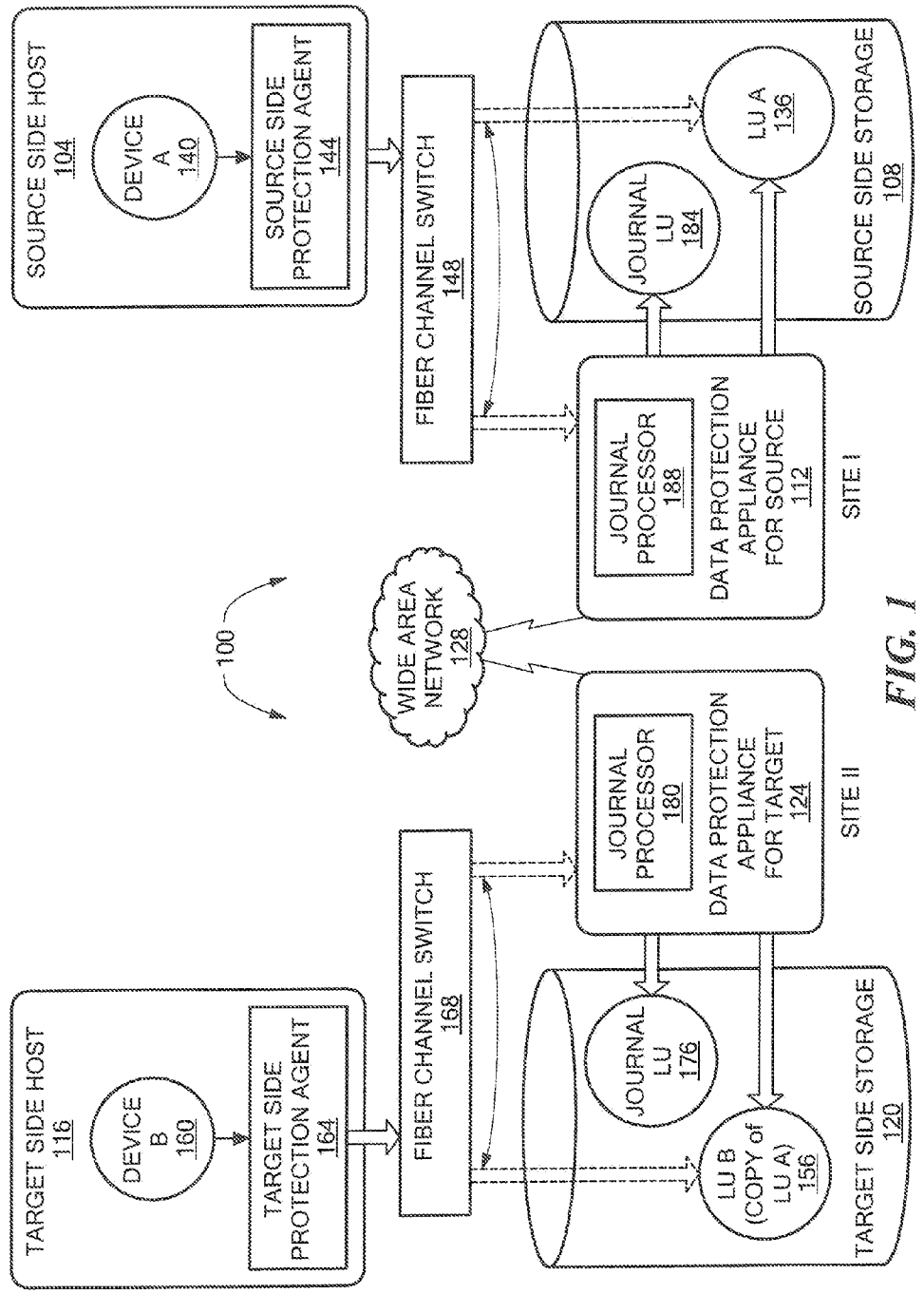
FIG. 1 is a block diagram of an example of a data protection system used with a continuous replication mode.

Described herein is an approach to allow for shipping a snapshot from a production site to a replica site and, depending if there is enough bandwidth, to allow for sending a journal of differences to the replica site to allow any point in time recovery.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O DATA—Data that will be or is written to a volume by, for example, an application, sometimes called write transaction data or write data;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Figure 2:
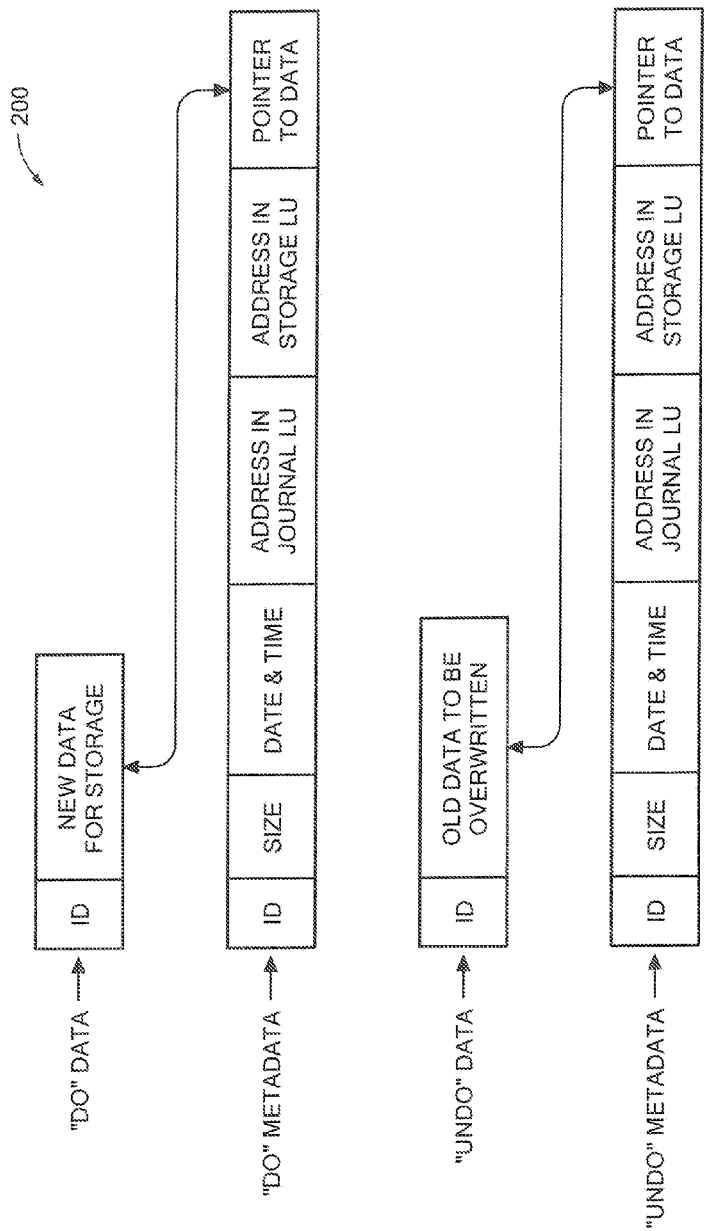
FIG. 2 is an illustration of an example of a journal history of write transactions for a storage system.

An Example of a Replication System Used with a Continuous Replication Mode (FIGS. 1 and 2)

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
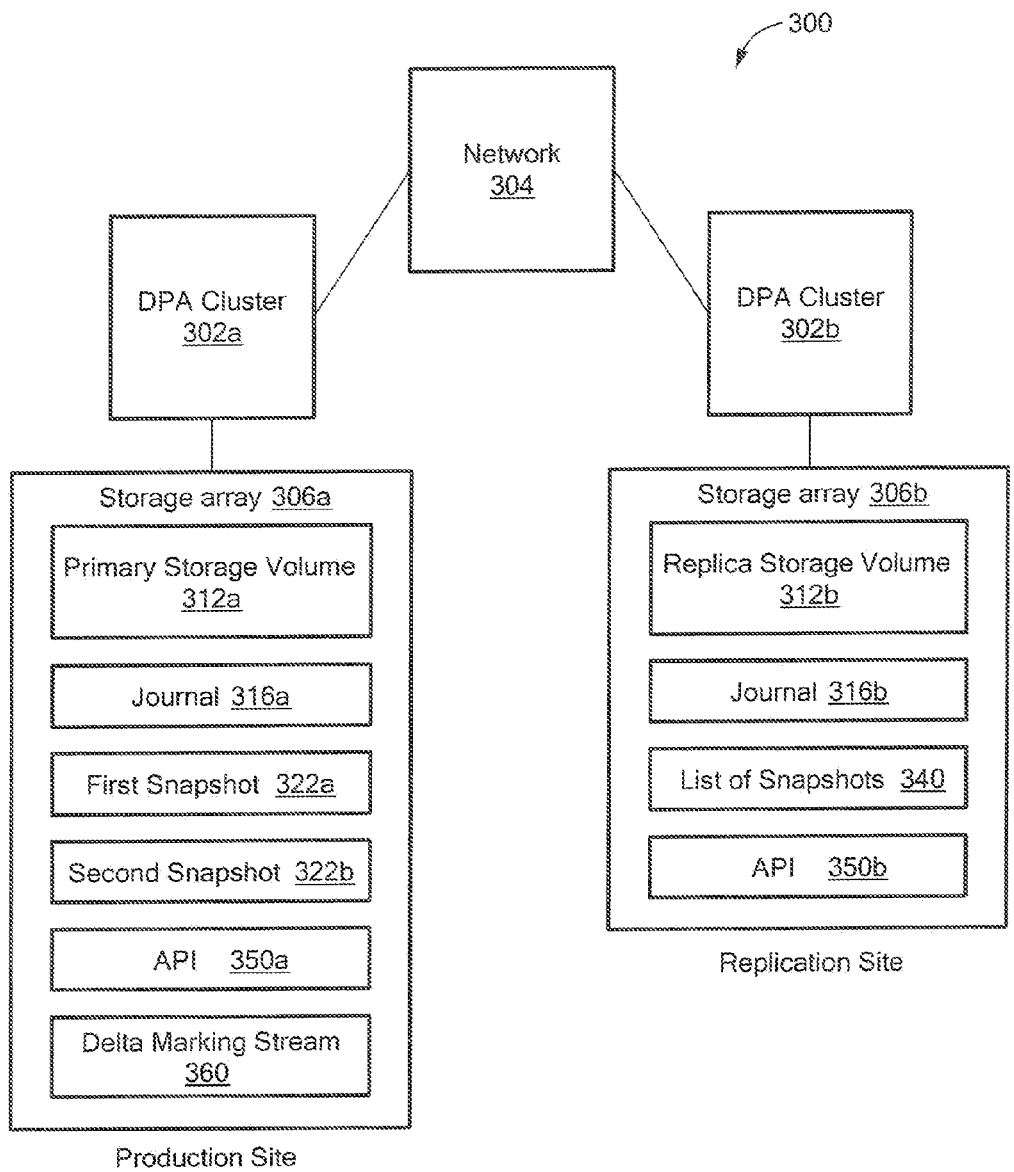
FIG. 3 is a block diagram of an example of a data protection system used with a snapshot shipping mode.
Figure 4:
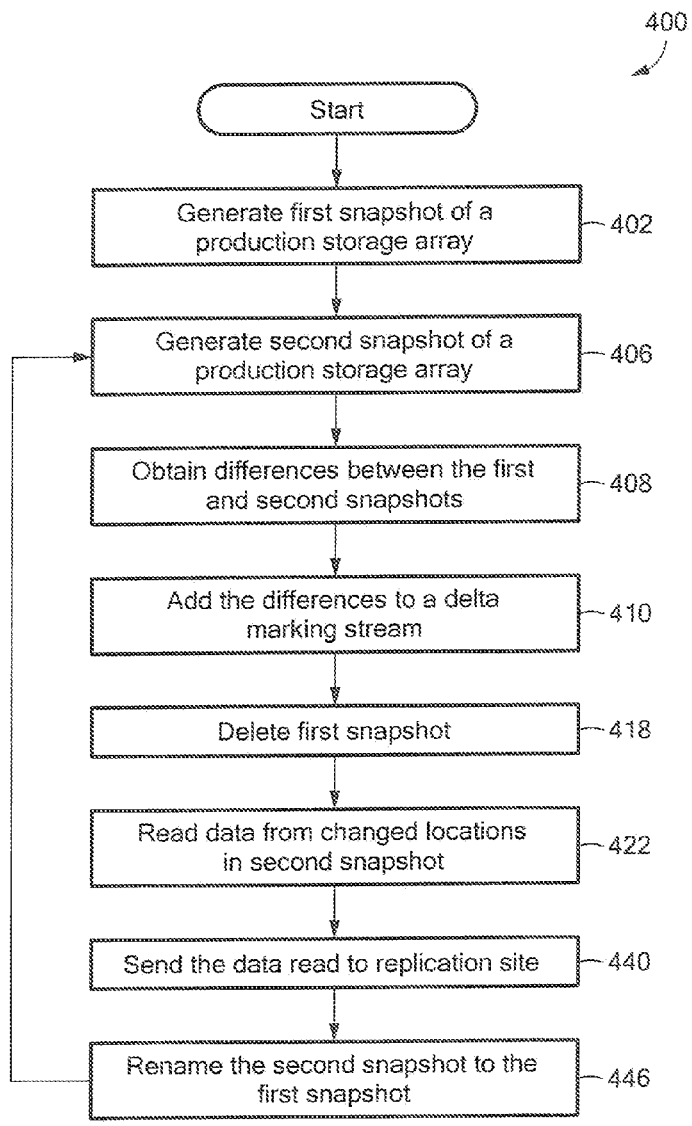
FIG. 4 is a flowchart of an example of a process to replicate data from a production site to a replication site using the snapshot shipping mode.

An Example of a Replication System Used with a Snapshot Shipping Mode (FIGS. 3 and 4)

Referring to FIG. 3, a data protection system 300 includes a data protection appliance (DPA) cluster 302a and a storage array 306a at a production site and a DPA cluster 302b and a storage array 306b at a replication site. The DPA clusters 302a, 302b are connected by a network 304 (e.g., a WAN, a Fibre Channel and so forth).

The storage array 306a includes a primary storage volume 312a, a journal 316a, a first snapshot 322a, a second snapshot 322b, APIs 350a and a delta marking stream 360. The storage array 306b includes a replica storage volume 312b which replicates the primary storage 312a, a journal 316b, a list of snapshots 340, and APIs 350b.

Referring to FIG. 4, an example of a process to send data from the production site to the replication site using a snapshot shipping mode is a process 400. Process 400 generates a first snapshot of a production storage array (402). For example, the DPA cluster 302a generates a first snapshot 322a of the primary storage volume 312a. In one example, the DPA cluster 302a generates the first snapshot 322a using the API 350a. At first time initialization, the first snapshot is sent to the replica site.

Process 400 generates a second snapshot of a production storage array (406). For example, the DPA cluster 302a generates a second snapshot 322b of the primary storage volume 312a. In one example, the DPA cluster 302a generates the second snapshot 322b using the API 350a.

Process 400 obtains differences between the first snapshot and the second snapshot (408). For example, the DPA cluster 302a obtains the differences between the first snapshot 322a and the second snapshot 322b by using the API 350a.

In one example, obtaining the differences between the first snapshot and the second snapshot may be performed by executing a vendor specific read difference command. The read difference command is a vendor specific command which returns locations of the difference and data in the locations. In one example, the result of executing the read difference command is a sequence of (location, length); (location, length) and so forth. In other examples, the read difference command returns a change bitmap.

Process 400 adds the differences to a delta marking stream (410). For example, the DPA cluster 302a adds the differences obtained in processing block 408 to the delta marking stream 360 using an the API 350a.

Process 400 deletes the first snapshot (418). For example, the DPA cluster 302a deletes the first snapshot 322a.

Process 400 reads the data that changed in the second snapshot (422) and sends the data to the replication site (440). For example, the DPA cluster 302a reads the data that changed in the second snapshot 322b and sends the data to the DPA cluster 302b.

Process 400 renames the second snapshot to the first snapshot (446) and performs processing block 406. For example, the DPA cluster 302a renames the second snapshot to the first snapshot.

Figure 5:
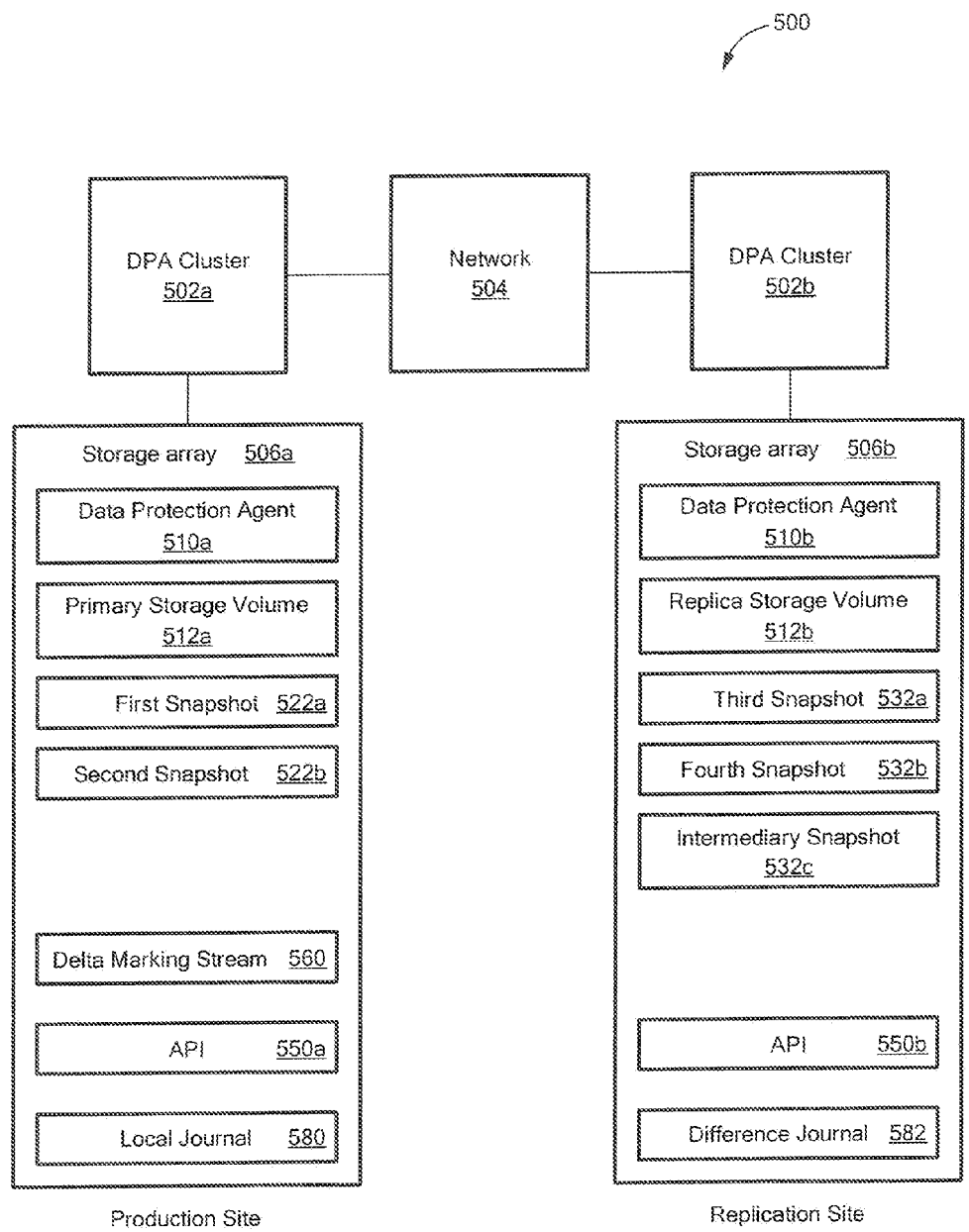
FIG. 5 is a block diagram of an example of a data protection system used with the continuous replication mode and the snapshot shipping mode.

Referring to FIG. 5, a data protection system 500 includes a data protection appliance (DPA) cluster 502a and a storage array 506a at a production site and a DPA cluster 502b and a storage array 506b at a replication site. The DPA clusters 302a, 302b are connected by a network 504 (e.g., a WAN, a Fibre Channel and so forth). The data protection system 500 can perform continuous replication as described in FIGS. 1 and 2 and can perform snapshot shipping as described in FIGS. 3 and 4.

The storage array 506a includes a data protections agent 510a (similar to the data protection agent 144 in FIG. 1 but located at a storage array), a primary storage volume 512a, a first snapshot 522a, a second snapshot 522b, API 550a, a delta marking stream 560 and a local journal 580. The storage array 306b includes a data protections agent 510b (similar to the data protection agent 164 in FIG. 1 but located at a storage array), a replica storage volume 512b which replicates the primary storage 512a, a third snapshot 532a, a fourth snapshot 532b, an intermediary snapshot 532c, API 350b and a difference journal 582.

Figures 6A, 6B, 6C:
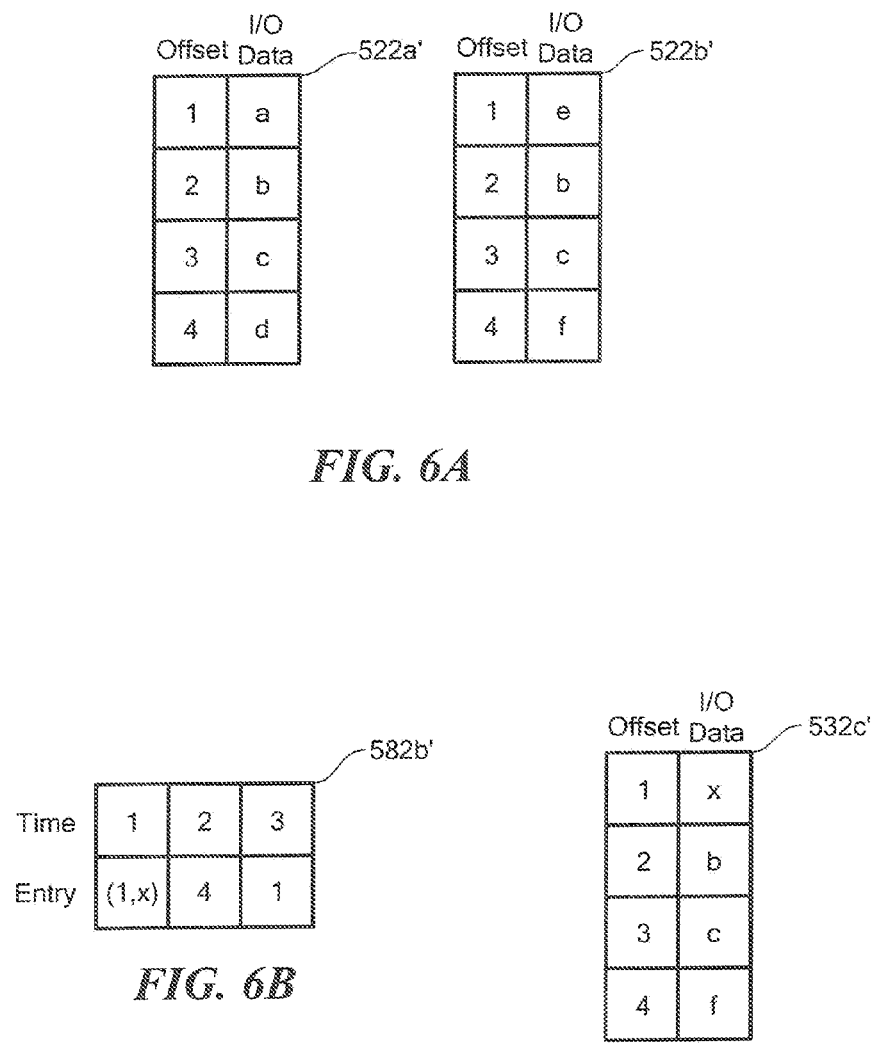

Referring to FIG. 6A, an example of a first snapshot 522a' of the primary storage volume 512a includes four offsets (locations) labeled 1 to 4 with I/O data a, b, c and d respectively. An example of a second snapshot 522a' of the primary storage volume 512a includes four offsets (locations) labeled 1 to 4 with I/O data e, b, c and f respectively. Thus, the only changes that occurred between the first and second snapshots are at offset 1 and offset 4.

Between the first snapshot and the second snapshot there are three increments of time where I/O data was written to the primary storage volume 512a. At time 1, the offset 1 with I/O data a is overwritten with I/O data x. At time 2, offset 4 with I/O data d is overwritten with I/O data f. At time 3, offset 1 with I/O data x is overwritten with I/O data e.

Referring to FIG. 6B, an example of a difference journal 582 is a difference journal 582'. The difference journal 582' records the changes between the first and second snapshots. For example, each journal entry in the differences journal 582 includes an offset of where the I/O data was written but may or may not include I/O data for that change. I/O data may not be included if it is already part of the second snapshot.

In this example, at time 1, an entry includes the offset 1 and data x. At time 2, an entry includes offset 4. No data needs to be included since the data (data f) written at time 2 is part of the second snapshot for that offset. At time 3, an entry includes offset 1. Again, no data needs to be included since the data (data e) written at time 3 is part of the second snapshot for that offset. Data is included in the difference journal 582 if and only if the location was overwritten more than twice during the time period between the two different snapshots that the difference journal 582 describes and the data in the location is not already part of the second snapshot (since otherwise the data is on the second snapshot and only the metadata is needed).

Figure 7:
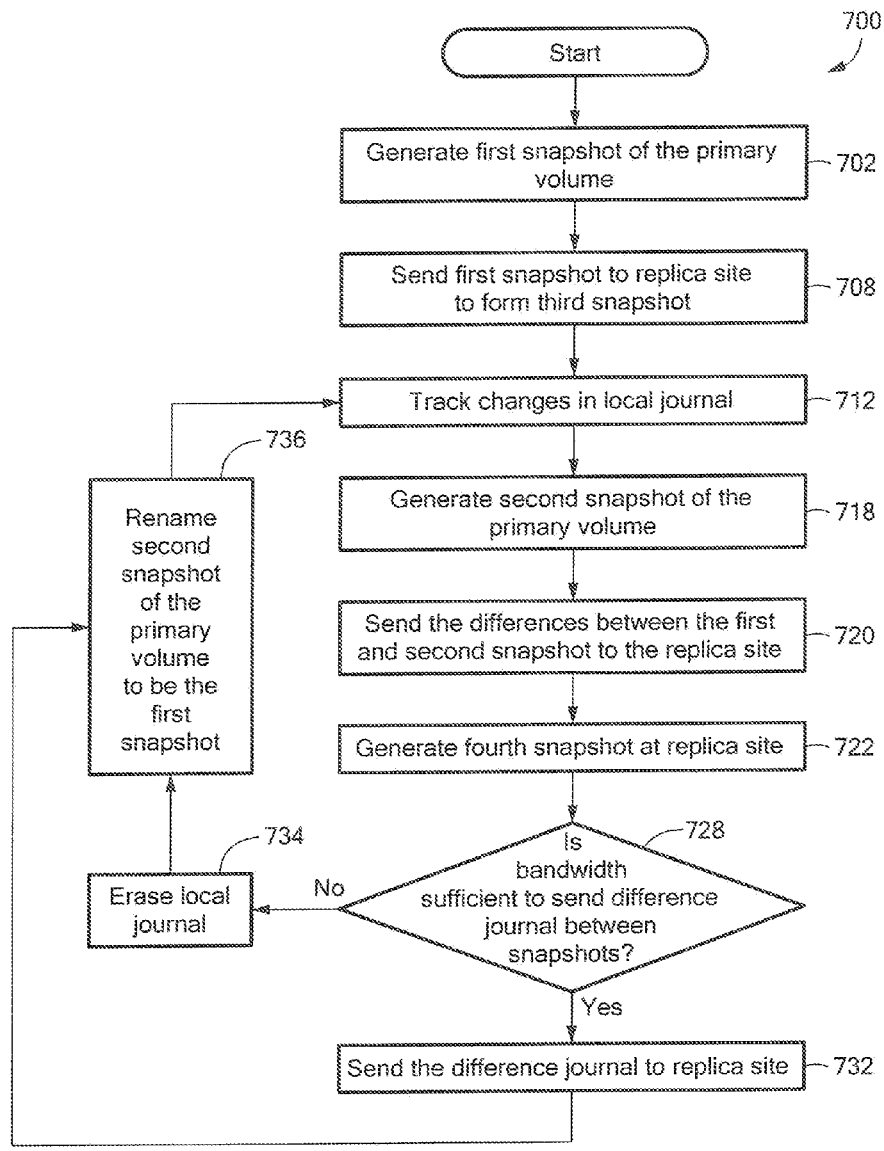
FIG. 7 is a flowchart of an example of a process to send written changes to a volume between two snapshots.

Referring to FIG. 7, an example of a process to send written changes to a volume between two snapshots is a process 700. In particular, the difference journal 582 between the first and second snapshots is sent to the replica site if there is sufficient bandwidth.

Process 700 generates the first snapshot (702) and sends the first snapshot to the replica site (708). For example, the API 550a is called to generate the first snapshot 522a of the primary storage volume 512a and ships the first snapshot 522a to the replica site to be stored at the storage array 506b as the third snapshot 532a.

Process 700 tracks the differences in the local journal (712). For example, the data protection agent 510a tracks data written in the primary storage volume 512 in a local journal 580. In another example, the data protection agent 510a sends the changes to the DPA 502a which tracks the changes in the local journal 580.

Process 700 generates the second snapshot of the primary volume (718). For example, the API 550a is called to generate the second snapshot 522b of the primary storage volume 512a The differences between the second snapshot 522b and the first snapshot 522a are sent to the replica site (720) and a fourth snapshot 532b is generated at the replica site (722). For example, the differences between the first and second snapshots 522a, 522b are added to the third snapshot 532a to form the fourth snapshot 532b.

Process 700 determines if there is sufficient bandwidth to send the difference journal between the first and second snapshots (728) (i.e., the journal containing the changes which allow access to any point in time between first and second snapshots). For example, DPA 502a determines the size of the difference journal and the amount of bandwidth available after sending the differences between snapshots 522a and 522b to the replica site.

If there is sufficient bandwidth to send the difference journal between the first and second snapshots, process 700 sends the difference journal to the replica site (732), renames second snapshot of the primary volume to be first snapshot (736) and returns to processing block 712. For example, the difference journal is sent and stored as the difference journal 582.

If there is not sufficient bandwidth to send the difference journal between the first and second snapshots, process 700 erases entries in the local journal 580 describing changes between first and second snapshots (734), renames second snapshot of the primary volume to be first snapshot (736) and returns to processing block 712.

Figure 8:
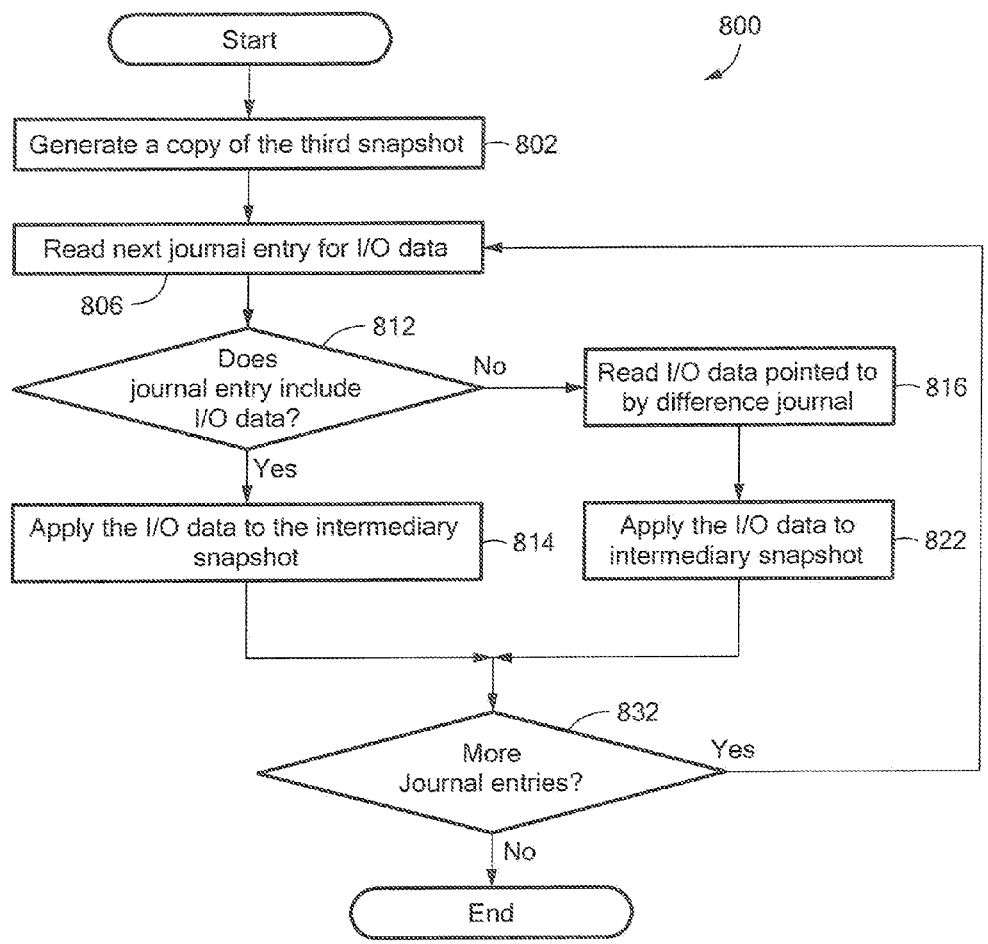
FIG. 8 is a flowchart of an example of a process to access a point in time between two snapshots at the replica site.

Referring to FIG. 8, an example of a process to access a point in time between two snapshots at the replica site is a process 800. In particular, the process 800 enables access to an intermediary snapshot at a time between the two times the two snapshots were taken by using the differences journal 582.

Process 800 generates a copy of the third snapshot (802). For example, the API 550a is called to generate a copy of the third snapshot 532a to form the intermediary snapshot 532c.

Process 800 reads next journal entry for I/O data (806). For example, the DPA 502b reads the first journal entry from the difference journal 582 recorded after the first snapshot of the primary storage volume.

Process 800 determines if the journal entry includes I/O data (812). For example, the DPA 502b determines if the journal entry in the differences journal 582 includes an offset and I/O data.

If the journal entry includes I/O data with an offset, process 800 applies the data to the intermediary snapshot (814). For example, the I/O data is applied to the offset in intermediary snapshot 532c formed at processing block 802.

If the journal entry does not include I/O data, process 800 reads I/O data pointed to by the differences journal (816) and applies the I/O data pointed to by the difference journal to the intermediary snapshot (822). For example, if there is no I/O data then the I/O data stored at the same offset in the fourth snapshot 532b is applied to the intermediary snapshot 532c.

Process 800 determines if there are more journal entries (832). If there are more journal entries, process 800 returns to processing block 806. If there are no more journal entries, process 800 ends.

Referring to FIG. 6C, an example of the intermediary journal 532c is an intermediary journal 532c', which is generated using the process 800 with the difference journal 582b' (FIG. 6B) at time=2.

Figure 9:
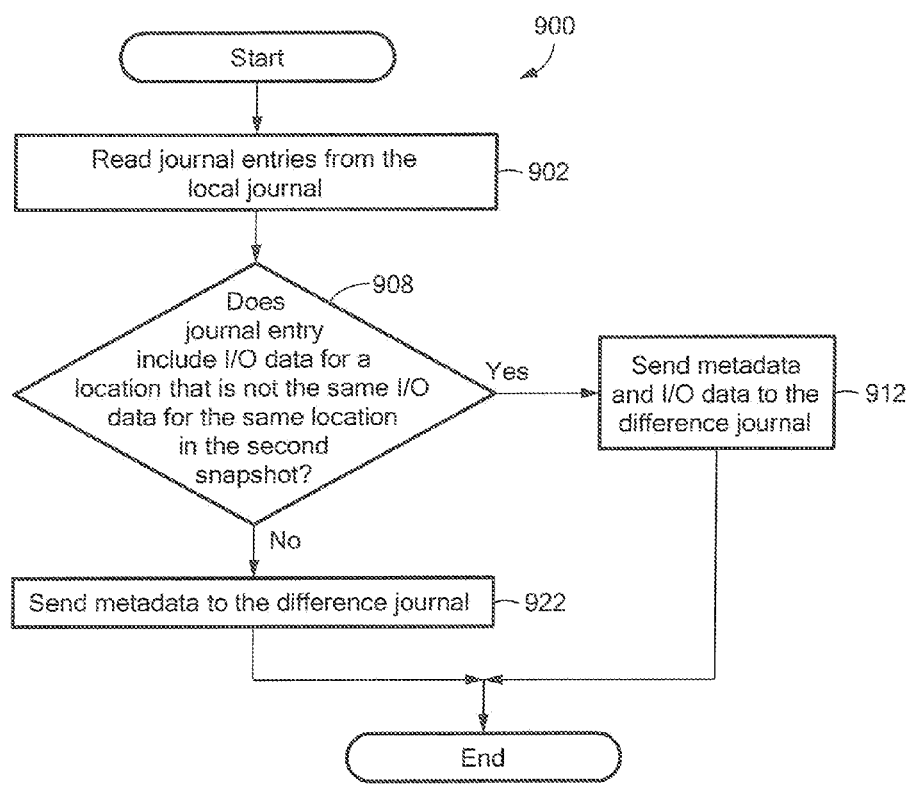
FIG. 9 is a flowchart of an example of a process to populate a difference journal.

Referring to FIG. 9, an example of a process to populate the difference journal is a process 900. Process 900 reads journal entries from the local journal 580 (902) and determines if a journal entry includes I/O data for a location (offset) that is not the same I/O data for the same location (offset) in the second snapshot 522b (908).

If the journal entry includes I/O data for a location that is not the same I/O data for the same location in the second snapshot 522b, process 900 sends metadata of the journal entry with the data to the difference journal 582 (912). If the journal entry includes I/O data for a location that is the same I/O data for the same location in the second snapshot 522b, only the metadata is sent to the difference journal 582 (922). In one example, the metadata includes at least one of an offset, a volume ID, a length of the I/O data or a number of blocks in a volume that is changed.

Figure 10:
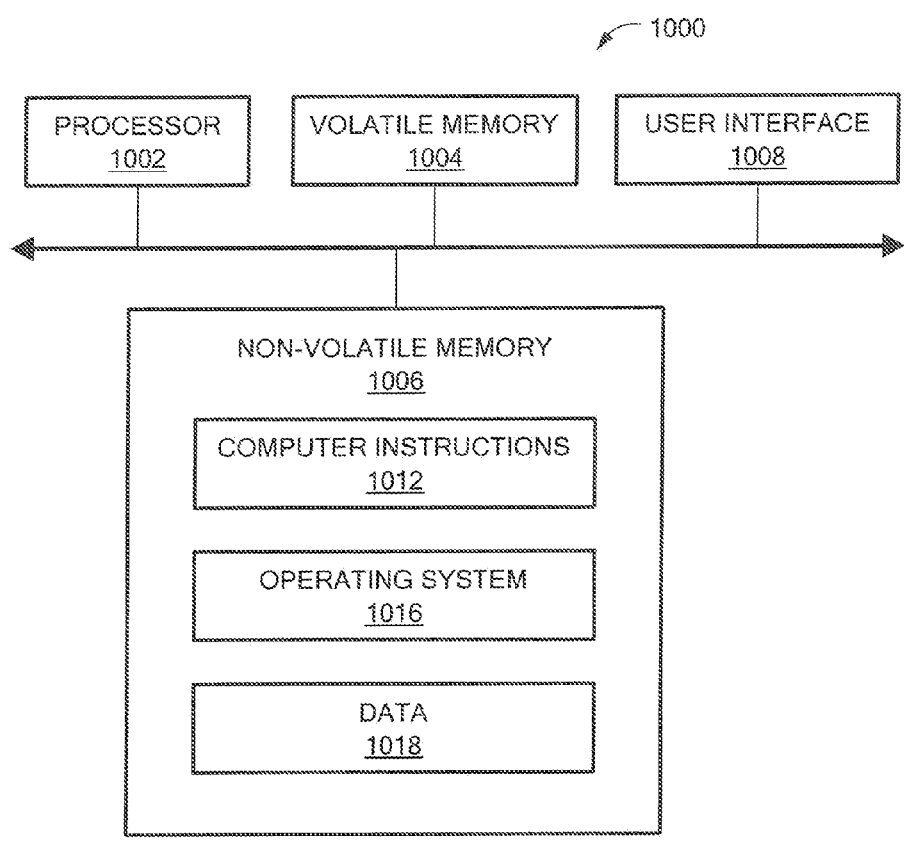
FIG. 10 is a computer on which any of the processes of FIGS. 7 to 9 may be implemented.

Referring to FIG. 10, in one example, a computer 1000 includes a processor 1002, a volatile memory 1004, a non-volatile memory 1006 (e.g., hard disk) and the user interface (UI) 1008 (e.g., a graphical user interface, a mouse, a keyboard, a display, touch screen and so forth). The non-volatile memory 1006 stores computer instructions 1012, an operating system 1016 and data 1018. In one example, the computer instructions 1012 are executed by the processor 1002 out of volatile memory 1004 to perform all or part of the processes described herein (e.g., processes 700, 800 and 900).

The processes described herein (e.g., processes 700, 800 and 900) are not limited to use with the hardware and software of FIG. 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of; data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 700, 800 and 900 are not limited to the specific processing order of FIGS. 7 to 9, respectively. Rather, any of the processing blocks of FIGS. 7 to 9 may be re-ordered, combined or removed, performed in parallel or in serial, as necessary, to achieve the results set forth above.

In other examples, one of ordinary skill in the art would recognize that increasing and decreasing reference counts may be done opposite as described. For example, the reference count can be decreased and then increased. One of ordinary skill in the art would also recognize that a value is changed from a first state to a second state when the signature data is needed to avoid erasure of the data and when the data is no longer needed the value returns to a first state.

The processing blocks (for example, in the processes 700, 800 and 900) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
sending a snapshot of a primary volume to a replica site, sending the snapshot of the primary volume comprises sending a first snapshot of the primary volume to form a third snapshot;
determining if a bandwidth is available to send changes in the primary volume to the replica site to allow any point in time recovery of data in the primary volume;
sending the changes from the primary volume if the bandwidth is available;

tracking the changes in a local journal;
generating a second snapshot of the primary volume:
sending the differences between the first and second snapshots to the replica site;
generating a fourth snapshot at the replica site by applying the differences between the first and second snapshots to the third snapshot; and
accessing an intermediary snapshot between the first snapshot and the second snapshot,
wherein accessing the intermediary snapshot comprises:
 copying the third snapshot to form an intermediary snapshot;
 for each journal entry in a difference journal, determining if the journal entry includes I/O data;
 applying I/O data from the difference journal to the intermediary snapshot if the journal entry comprises I/O data; and
 applying I/O data pointed to by the difference journal if the journal entry does not include I/O data.

2. The method of claim 1, further comprising generating the difference journal comprising:
 reading journal entries in the local journal;
 for each journal entry in the local journal, determining if the I/O includes I/O data for a location that is not the same I/O data for the same location in the second snapshot;
 sending metadata and I/O data to the difference journal if the I/O includes I/O data for a location that is not the same I/O data for the same location in the second snapshot; and
 sending metadata to the difference journal if the I/O includes I/O data for a location that is the same I/O data for the same location in the second snapshot.

3. The method of claim 2 wherein sending metadata to the difference journal if the I/O includes I/O data for a location that is the same I/O data for the same location in the second snapshot comprises sending metadata comprising at least one of at least one of an offset, a volume ID, a length of the I/O data or a number of blocks in a volume that is changed.

4. A method comprising:
 sending a snapshot of a primary volume to a replica site, sending the snapshot of the primary volume comprises sending a first snapshot of the primary volume to form a third snapshot;
 determining if a bandwidth is available to send changes in the primary volume to the replica site to allow any point in time recovery of data in the primary volume;
 sending the changes from the primary volume if the bandwidth is available;
 tracking the changes in a local journal:
 generating a second snapshot of the primary volume;
 sending the differences between the first and second snapshots to the replica site:
 generating a fourth snapshot at the replica site by applying the differences between the first and second snapshots to the third snapshot; and
 if the bandwidth is not available:
  erasing the local journal;
  renaming the second snapshot to be the first snapshot; and
  repeating the tracking of changes in the local journal.

5. An apparatus, comprising:
 electronic hardware circuitry configured to:
  send a snapshot of a primary volume to a replica site;
  determine if a bandwidth is available to send changes in the primary volume to the replica site to allow any point in time recovery of data in the primary volume;
  send the changes from the primary volume if the bandwidth is available;
  track the changes in a local journal;
  generate a second snapshot of the primary volume:
  send the differences between a first snapshot and the second snapshot to the replica site;
  generate a fourth snapshot at the replica site by applying the differences between the first and second snapshots to a third snapshot; and
  access an intermediary snapshot between the first snapshot and the second snapshot comprising circuitry,
 wherein the circuitry configured to send a snapshot of the primary volume comprises circuitry configured to send the first snapshot of the primary volume to form the third snapshot,
 wherein the circuitry configured to access an intermediary snapshot between the first snapshot and the second snapshot comprises circuitry configured to:
  copy the third snapshot to form an intermediary snapshot;
  for each journal entry in a difference journal, determine if the journal entry includes I/O data;
  apply I/O data from the difference journal to the intermediary snapshot if the journal entry comprises I/O data; and
  apply I/O data pointed to by the difference journal if the journal entry does not include I/O data.

6. The apparatus of claim 5 wherein the circuitry comprises at least one of a processor, a memory, a programmable logic device or a logic gate.

7. An apparatus, comprising:
 electronic hardware circuitry configured to:
  send a snapshot of a primary volume to a replica site;
  determine if a bandwidth is available to send changes in the primary volume to the replica site to allow any point in time recovery of data in the primary volume;
  send the changes from the primary volume if the bandwidth is available;
  track the changes in a local journal;
  generate a second snapshot of the primary volume:
  send the differences between a first snapshot and the second snapshot to the replica site;
  generate a fourth snapshot at the replica site by applying the differences between the first and second snapshots to a third snapshot;
  erase the local journal if the bandwidth is not available;
  rename the second snapshot to be the first snapshot if the bandwidth is not available; and
  repeat the tracking of changes in the local journal if bandwidth is not available,
 wherein the circuitry configured to send a snapshot of the primary volume comprises circuitry configured to send the first snapshot of the primary volume to form the third snapshot.

8. The apparatus of claim 7, further comprising circuitry configured to generate the difference journal comprising circuitry configured to:
 read journal entries in the local journal;
 for each journal entry in the local journal, determine if the I/O includes I/O data for a location that is not the same I/O data for the same location in the second snapshot;
 send metadata and I/O data to the difference journal if the I/O includes I/O data for a location that is not the same I/O data for the same location in the second snapshot; and send metadata to the difference journal if the I/O includes I/O data for a location that is the same I/O data for the same location in the second snapshot.

9. The apparatus of claim 8 wherein the circuitry configured to send metadata to the difference journal if the I/O includes I/O data for a location that is the same I/O data for the same location in the second snapshot comprises circuitry configured to send metadata comprising at least one of an offset, a volume ID, a length of the I/O data or a number of blocks in a volume that is changed.

10. An article comprising:
a non-transitory computer-readable medium that stores computer-executable instructions, the instructions causing a machine to:
send a snapshot of a primary volume to a replica site;
determine if a bandwidth is available to send changes in the primary volume to the replica site to allow any point in time recovery of data in the primary volume;
send the changes from the primary volume if the bandwidth is available;
track the changes in a local journal;
generate a second snapshot of the primary volume:
send the differences between a first snapshot and the second snapshot to the replica site;
generate a fourth snapshot at the replica site by applying the differences between the first and second snapshots to a third snapshot; and
access an intermediary snapshot between the first snapshot and the second snapshot,
wherein the instructions causing the machine to send a snapshot of the primary volume comprises instructions causing the machine to send a first snapshot of the primary volume to form a third snapshot,
wherein the instructions causing the machine to access an intermediary snapshot between the first snapshot and the second snapshot comprises instructions causing the machine to:
copy the third snapshot to form an intermediary snapshot;
for each journal entry in a difference journal, determine if the journal entry includes I/O data;
apply I/O data from the difference journal to the intermediary snapshot if the journal entry comprises I/O data; and
apply I/O data pointed to by the difference journal if the journal entry does not include I/O data.

11. The apparatus of claim 10, further comprising instructions causing the machine to generate the difference journal comprising instructions causing the machine to:
read journal entries in the local journal;
for each journal entry in the local journal, determine if the I/O includes I/O data for a location that is not the same I/O data for the same location in the second snapshot;
send metadata and I/O data to the difference journal if the I/O includes I/O data for a location that is not the same I/O data for the same location in the second snapshot; and
send metadata to the difference journal if the I/O includes I/O data for a location that is the same I/O data for the same location in the second snapshot.

12. The apparatus of claim 11 wherein the instructions causing the machine to send metadata to the difference journal if the I/O includes I/O data for a location that is the same I/O data for the same location in the second snapshot comprises instructions causing the machine to send metadata comprising at least one of an offset, a volume ID, a length of the I/O data or a number of blocks in a volume that is changed.

13. An article comprising:
a non-transitory computer-readable medium that stores computer-executable instructions, the instructions causing a machine to:
send a snapshot of a primary volume to a replica site;
determine if a bandwidth is available to send changes in the primary volume to the replica site to allow any point in time recovery of data in the primary volume;
send the changes from the primary volume if the bandwidth is available;
track the changes in a local journal;
generate a second snapshot of the primary volume;
send the differences between a first snapshot and the second snapshot to the replica site;
generate a fourth snapshot at the replica site by applying the differences between the first and second snapshots to a third snapshot;
erase the local journal if the bandwidth is not available;
rename the second snapshot to be the first snapshot if the bandwidth is not available; and
repeat the tracking of changes in the local journal if bandwidth is not available,
wherein the instructions causing the machine to send a snapshot of the primary volume comprises instructions causing the machine to send a first snapshot of the primary volume to form a third snapshot.

\* \* \* \* \*